United States Patent [19]

Eisenberg

[11] 3,824,339

[45] July 16, 1974

[54] PROMPTING DEVICE FOR LECTURERS AND TELEVISION ANNOUNCERS

[75] Inventor: Alvin S. Eisenberg, Little Neck, N.Y.

[73] Assignee: Q-TV, Inc., New York, N.Y.

[22] Filed: Nov. 9, 1972

[21] Appl. No.: 305,057

[52] U.S. Cl. .................. 178/7.81, 178/6.8, 178/7.9, 178/DIG. 30, 352/4

[51] Int. Cl. ......................... G03b 31/00, H04n 5/24

[58] Field of Search ............ 178/DIG. 30, 7.81, 7.9, 178/6.8; 352/4

[56] References Cited

UNITED STATES PATENTS

| | | | |
|---|---|---|---|
| 2,487,242 | 11/1949 | Holland | 352/4 |
| 2,635,373 | 4/1953 | Barkau | 178/DIG. 30 |
| 2,796,801 | 6/1957 | Simjian | 178/DIG. 30 |
| 2,934,601 | 4/1960 | Oppenheimer | 352/4 |
| 3,461,228 | 8/1969 | Bookman | 178/DIG. 30 |
| 3,578,905 | 5/1971 | Anders | 178/7.9 |
| 3,748,384 | 7/1973 | Eisenberg | 178/DIG. 30 |

*Primary Examiner*—Howard W. Britton
*Attorney, Agent, or Firm*—Albert F. Kronman, Esq.

[57] ABSTRACT

A manuscript in card, sheet, or strip form is moved across a table which is the object plane of a television camera. The camera is adjustably positioned above the table and the camera output is connected to a closed circuit system which includes one or more television picture tubes for showing an image of the manuscript. One picture tube is positioned in front of the speaker. Electrical controls are provided for adjusting the speed of the manuscript as it moved through the object plane. Adjustments are also available for focusing the television camera lens and for swinging the camera from one position to another to pick up information to be conveyed to the speaker.

2 Claims, 9 Drawing Figures

PROMPTING DEVICE FOR LECTURERS AND TELEVISION ANNOUNCERS

BACKGROUND OF THE INVENTION

Many types of prompting devices have been used in the past to assist a speaker in the delivery of his speech. Sometimes these devices have included large sheets held by assistants in a manner so that the speaker can refer to their messages in a convenient manner. Other types of prompters have included the entire address typed or written on a long sheet of paper and stored in a roll. A motor unwinds the roll in front of the speaker at a rate approximately equalling the rate of the speaker's delivery. Such devices have many disadvantages. The large sheets are difficult to handle and cannot be used effectively when an audience is present. The roll device must be set up in advance and cannot be edited to conform to late occurrences such as recent news items or sudden requirements for instruction.

The present invention avoids these disadvantages and provides a prompting device which is flexible, compact, and can be used in a television studio without detracting from the view of the speaker. It is especially useful in television broadcasting of the news but the system can be adapted to many other situations involving a speaker and an audience.

One of the features of the invention is the use of a swingable camera mount which permits an operator to switch abruptly from manuscripts on one object plane to another object plane and thereby transmit another message at once to a television picture tube in front of the speaker.

Another feature of the invention is the remote control whereby an operator can feed news items into the object plane while in a remote location such a another room or a sound proof booth adjacent to the speaker.

Another feature of the invention is the use of multiple picture tubes which may be coupled to the speaker's tube. The additional picture tubes may be used to monitor the speaker's delivery and check the editorial quality.

Other features and additional details of the invention will be disclosed in the following description, taken in connection with the accompanying drawings.

DESCRIPTION OF THE PREFERRED EMBODIMENT

Figure 1:
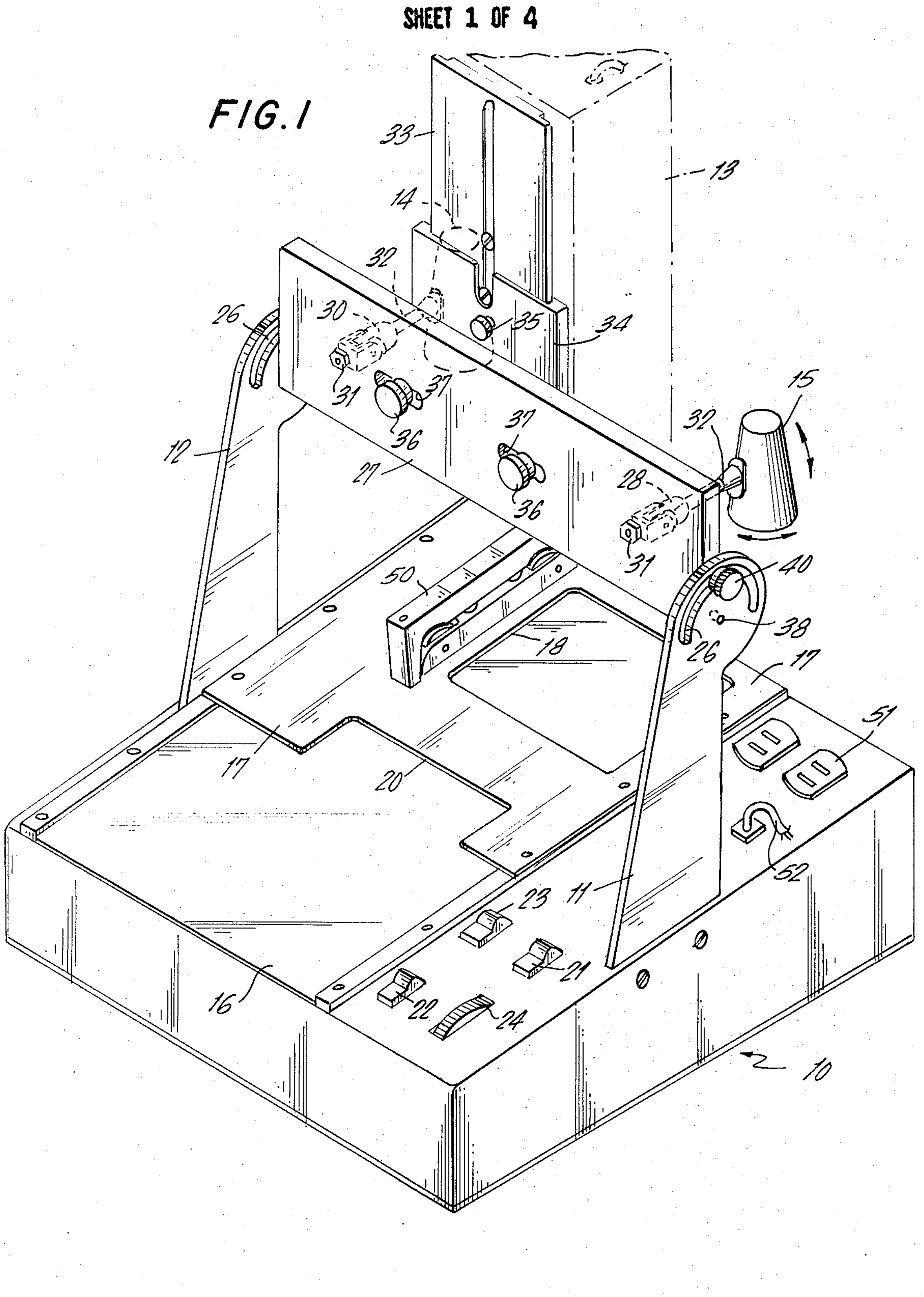
FIG. 1 is a perspective view of the prompting device showing the table containing the object plane, the supporting means for a television camera and some of the controls.
Figures 2, 3:
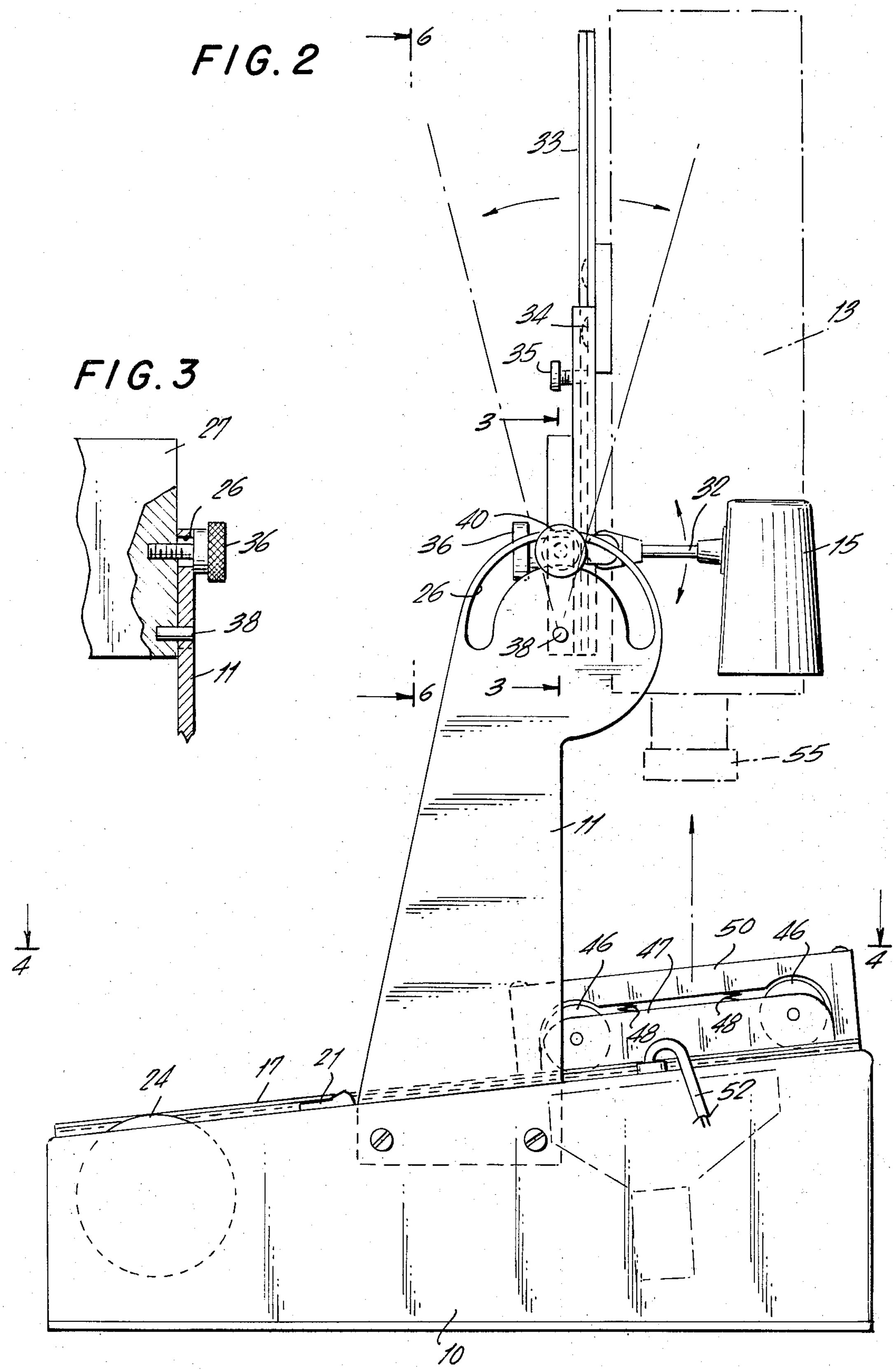
FIG. 2 is a side view of the structure shown in FIG. 1.
FIG. 3 is a cross sectional view of the arcuate adjustment for securing the camera to the support and is taken along line 3—3 of FIG. 2.
Figure 4:
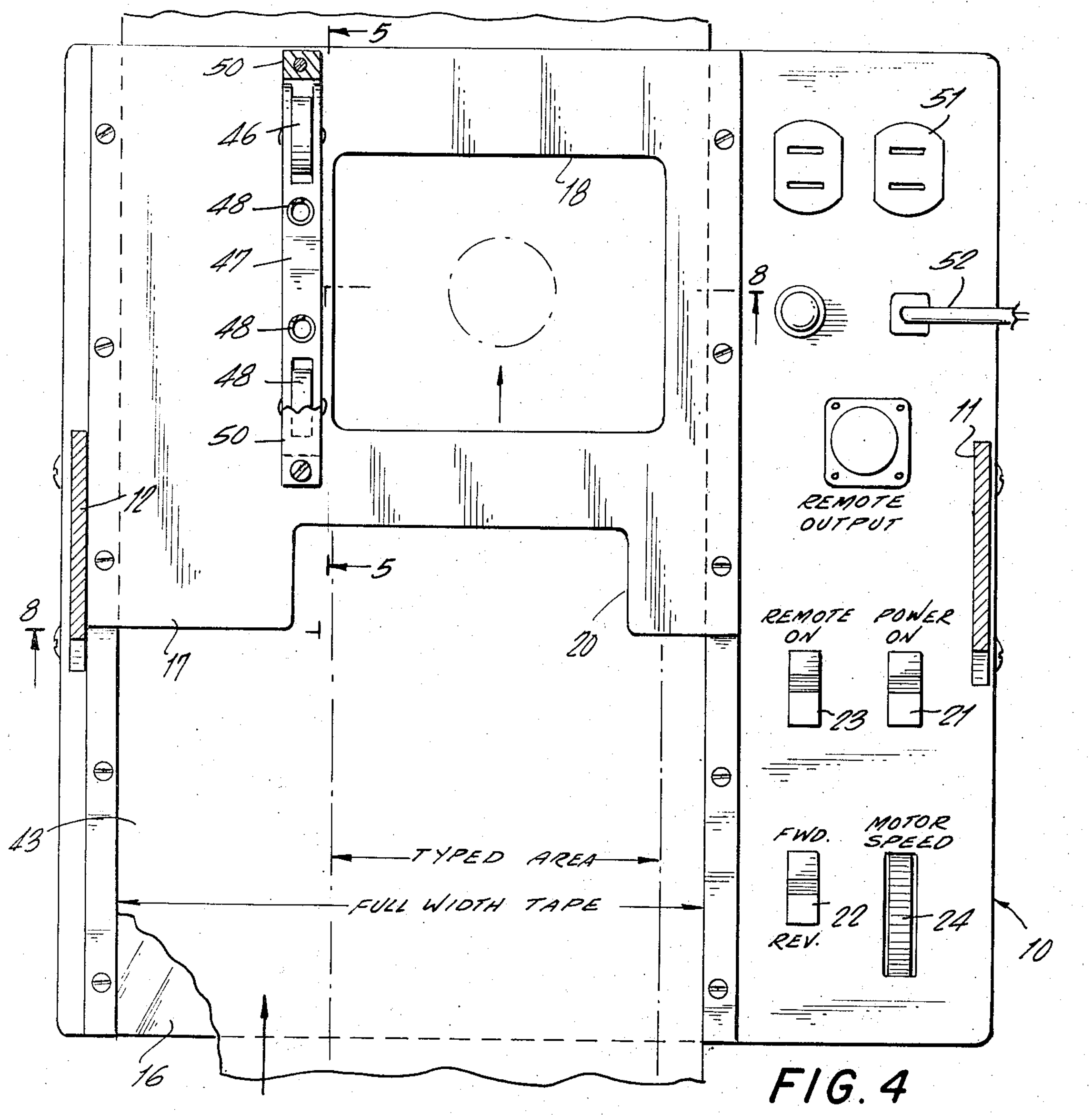
FIG. 4 is a plan view of the table with some parts in section. This view is taken on line 4—4 of FIG. 2.

The prompting device shown in FIG. 1 comprises a base compartment 10 which houses many of the control components and which holds two supports 11 and 12 for adjustable mounting of a television camera 13 and two lamps 14 and 15. The top of the base compartment 10 is covered by a metal sheet 16 which defines an object plane of the television camera lens system. A manuscript retaining cover 17 is mounted above the metal sheet 16 with enough space between them to permit a card or several sheets of paper to pass between them. In one part of the cover 17, a window 18 is provided for framing the message symbols picked up by the television camera 13. A cut-out portion 20 is also provided for aiding in the entry of cards and small pieces of paper which are to be viewed by the speaker on the picture tube screen.

The cover sheet 16 also supports several control switches such as, a power ON switch 21, a forward and reverse motor switch 22, and a switch 23 which applies a television signal to the remote television picture tubes. Also, available above the surface of the cover sheet 16 is a portion of a control disk 24 which is coupled to a variable resistance in series with a motor 25 for moving the manuscript through the object plane. The disk 24 controls the speed of the motor and is adjusted by an operator to move the manuscript to keep pace with the speaker as he reads the message.

The two upright supports 11 and 12 are each formed with a pivot point 38 and an arcuate slot 26 for adjustably holding a camera mounting plate 27. The plate 27 also supports two lamps 14, 15. Each lamp is adjustable by means of a ball and socket joint 28 and 30 positioned between a nut and bolt fastening means 31 and an arm 32 to which the lamp socket is attached. The ball and socket joint 28 permits adjustment up and down, and also around the arm axis as indicated by the arrows in FIG. 1.

The television camera 13 is secured to an adjusting plate 33 which is slidable in a supporting bracket 34 and clamped in a focused position by a thumb screw 35. The bracket 34 is also adjustable, in a lateral direction, by means of two lock screws 36 positioned in slots 37 in the mounting plate 27. The mounting plate 27 and all the components it supports can be adjustably positioned at any angle up to 180° around the pivot 38 by locking screws 40 in slots 26.

Figure 5:
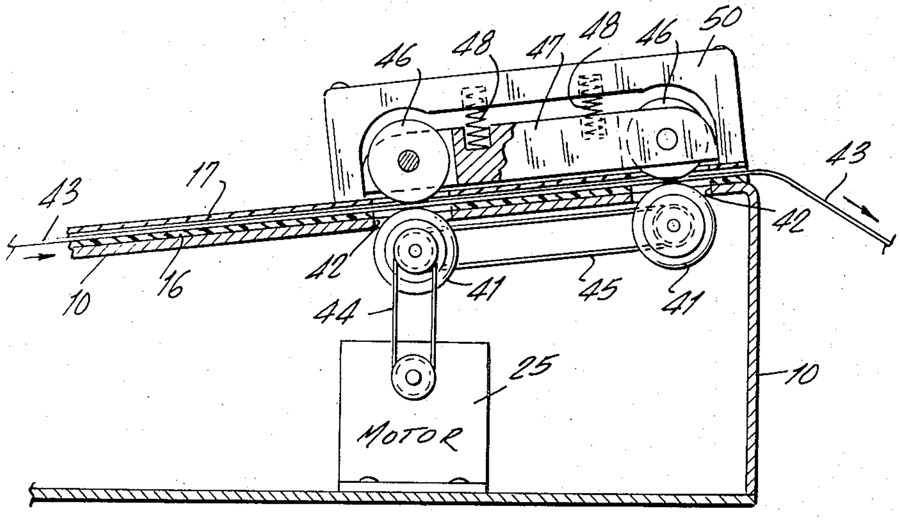
FIG. 5 is a cross sectional view of the feed wheels for conveying the paper through the object plane on the table. This view is taken along line 5—5 of FIG. 4.

The manuscript in strips or cards bearing the messages to be used by the speaker is moved through the object plane of the television camera lens by a set of power rollers 41 shown in FIG. 5. The two rollers 41 are positioned in slots 42 so that portions of their edges protrude above the plane of the cover sheet 16 and are in a position to engage the manuscript 43. One of the rollers 41 is coupled to the motor 25 by a belt 44 and both the rollers 41 are coupled to each other by another belt 45. Two idler rollers 46 are mounted directly above the power rollers 41 and are journalled in a carriage 47 which is pressed down by a pair of springs 48. The idler rollers 46 and their carraige 47 are protected by a shield 50, secured to the paper guide plate 17.

Figures 6, 7, 8, 9:
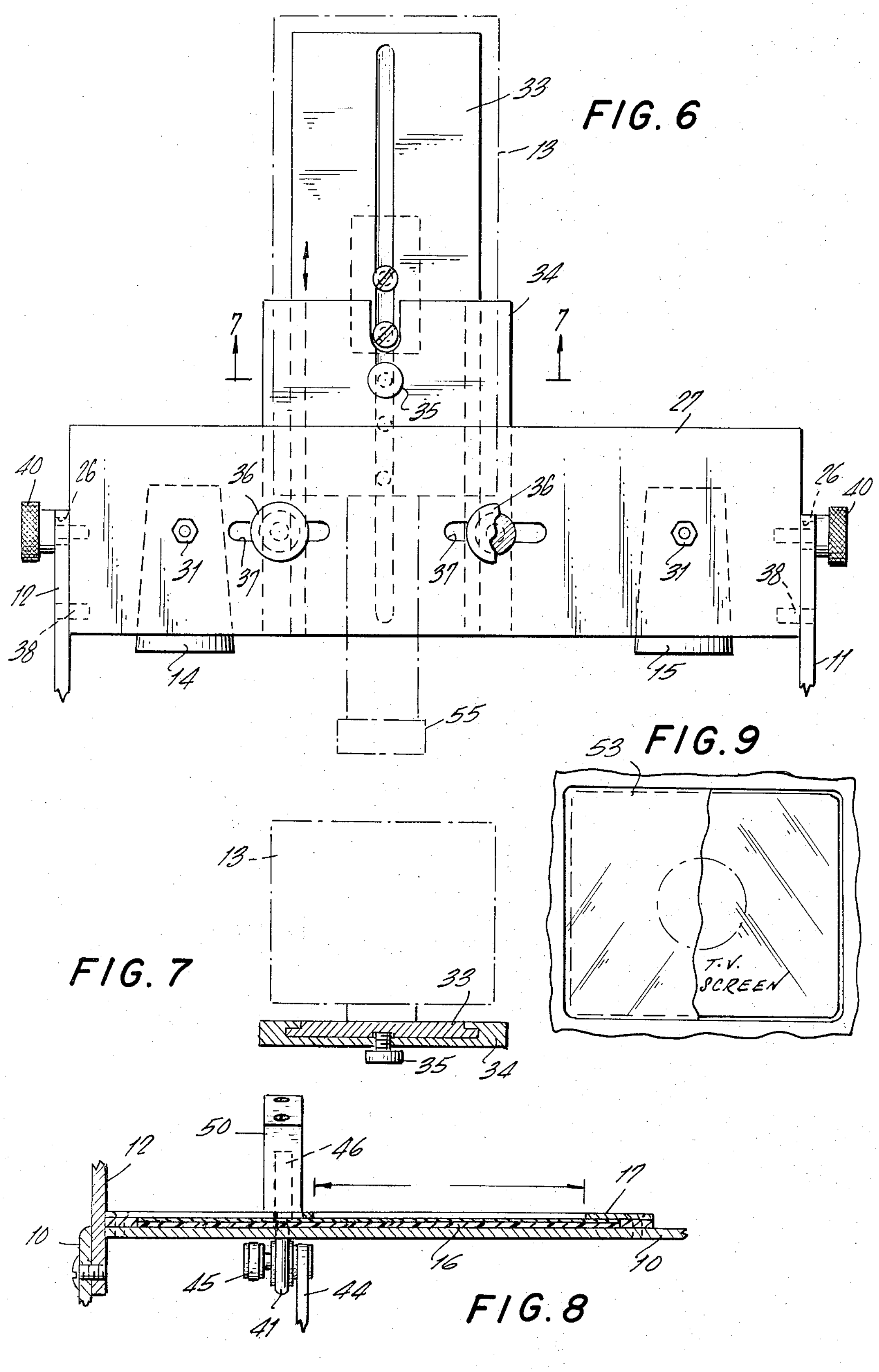
FIG. 6 is a front view of the adjustable structure which supports the television camera and the illuminating lamps. This view is taken along line 6—6 of FIG. 2.
FIG. 7 is a cross sectional view of a portion of the slide which holds the television camera and is taken along line 7—7 of FIG. 6.
FIG. 8 is a cross sectional view of a portion of the table shown in FIG. 4 and is taken along line 8—8 of that figure.
FIG. 9 is a front view of a television picture tube which contains a fluorescent screen adapted to show a message to an announcer.

Power may be supplied to the prompter device by a line and socket coupled to a coupling 51. The television picture tube 53 (FIG. 9) receives its signal and synchronizing pulses from the prompter through a cable 52. Additional picture tubes (not shown) may be coupled to the prompter device by coupling 54.

The operation of the prompter device requires the services of an operator who sits in front of the base and feeds cards or rolls of paper to the object space within window 18. The operator listens to the words delivered by the speaker and adjusts the speed of the motor 25 by disk 24 so that new elements of the message are always visible. The words and symbols which make up the message are focused by a lens 55 on the camera tube assembly and are shown on the television picture tube in front of the speaker. The speaker reads the messages without being encumbered by any adjustments, switches, or dials that he must operate himself. If the speaker stops for a moment or adds subject matter of his own, the operator compensates for the delay by slowing down the motor speed or by stopping the motor. The combination of this type of prompter device plus the supervision of an operator, add much to the flexibility of delivery and produces a more natural speech delivery.

In the event hand signals or information not in the possession of the operator are to be conveyed to the speaker, the operator can swing the camera from the vertical position to pick up these instructions which will then be seen on the television display screen (not shown).

Having thus fully described the invention, what is claimed as new and desired to be secured by Letters Patent of the United States is:

1. A prompting device for speakers comprising: a hollow base, a cover sheet forming the upper surface of said base for retaining a manuscript having a message thereon; a rockable plate supported on brackets and positioned above the upper surface of the base; a television camera adjustably mounted on the rockable plate for generating television signals corresponding to the message; a vertical slide adjusting means coupling the television camera to the rockable plate for focusing the camera on the manuscript; a pair of illuminating lamps adjustably mounted on the rockable plate for illuminating the manuscript; an electric motor and a pair of driver rollers driven by the motor within said base for moving the manuscript along said upper surface; and manual control means mounted in the base for varying the speed of the motor.

2. A prompting device according to claim 1 wherein a pair of idler rollers is mounted above the driver rollers for resiliently pressing on the edge of a manuscript to move it through an object space while permitting the message to be visible.

* * * * *